June 11, 1963  H. J. WEBBER  3,093,198
ICE AUGER
Filed July 28, 1961

INVENTOR.
HERMAN J. WEBBER
BY
William F. Woods
ATTORNEY

United States Patent Office 3,093,198
Patented June 11, 1963

3,093,198
ICE AUGER
Herman J. Webber, Kelliher, Minn.
Filed July 28, 1961, Ser. No. 127,521
8 Claims. (Cl. 175—18)

This invention relates to a new and improved ice auger; in particular, it concerns an ice auger having novel ice cutting means adapted for rotation by means of a crank like handle.

Practically all of the prior art devices for cutting holes in ice (for fishing and similar purposes) rely upon an arrangement of cutting teeth or blades that rotate in a substantially horizontal plane about the vertical axis of the tool. The teeth or blades are generally positioned so as to follow one another in generally concentric circular paths; the resulting cutting action is essentially a gouging out of concentric furrows of ice by the teeth as they are caused to rotate. The teeth are usually mounted in a vertically depending manner so that contact with the ice is made with the sides thereof rather than with their pointed ends. These structural features promote the gouging action thereby adversely affecting the operational characteristics of the auger. Another disadvantage of many ice augers is the rigid manner in which the ice cutting head is fastened to the operating shaft; such a connection has been found to be generally undesirable because the cutting head is not able to adapt itself to irregularities in the ice resulting in slanted holes and other difficulties.

Accordingly, it is a primary object of this invention to provide an ice auger that will overcome the disadvantages listed above.

Another important object of this invention is to provide an improved ice auger exhibiting increased cutting efficiency and greater ease of operation.

A further object of this invention is to provide an ice auger that is relatively inexpensive to produce, easy to operate, rugged in construction and extremely durable.

Another object of this invention is to provide a novel ice auger having a non-rigid connection between the cutting head and the operating shaft.

Yet another object of this invention is to provide an ice auger having a novel cutting head adapted to provide increased cutting efficiency and speed.

Another object of this invention is to provide an ice auger equipped with novel means for retaining the ice that is removed by the cutting head.

Another object of this invention is to provide in an ice auger of the type described new and different means of arranging the teeth on the cutting head.

A further object of this invention is to provide an ice auger having a floating cutting head cooperable with a hand operating shaft for efficiently and rapidly cutting and removing ice from a lake, stream or similar location.

These and other objects and advantages of the invention will become apparent from a consideration of the following detailed specification and accompanying drawing wherein a preferred embodiment of the invention is shown by way of illustration and not by way of limitation.

Figure 1:
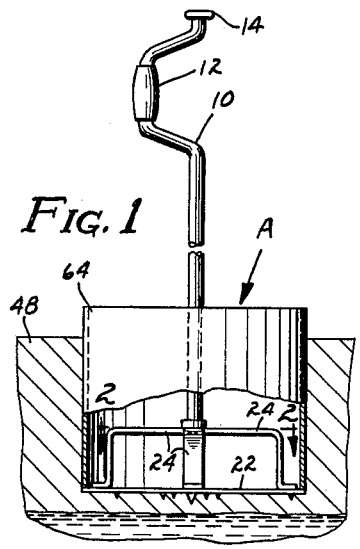
FIGURE 1 is a fragmentary side elevational view, partially in section, showing the invention in an ice cutting position.
Figure 2:
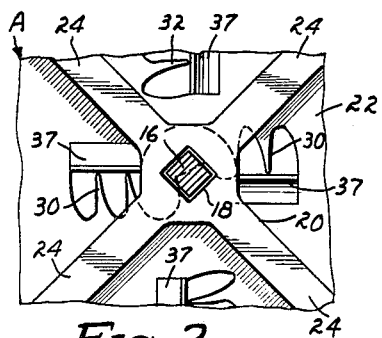
FIGURE 2 is an enlarged fragmentary view, partially in section, taken along the line 2—2 of FIGURE 1, with the spider of FIGURE 1 being rotated 45°.

Referring to the drawing and more particularly to FIGURES 1 and 2 thereof, the invention, designated in its entirety by reference character A, is made up of an operating shaft 10 provided with a crank 12 having a rotatable grip 14. The lower end of shaft 10 is squared off, as at 16, so as to be received freely within a corresponding aperture 18, which is cut centrally in the body of spider 20 that connects shaft 10 with cutting disk 22. Spider 20 has four depending arms 24, which are fastened by suitable means to the upper surface of disk 22 in spaced relation to its perimeter. A cotter pin through the lower end of shaft 10 holds the assembly together.

Figure 3:
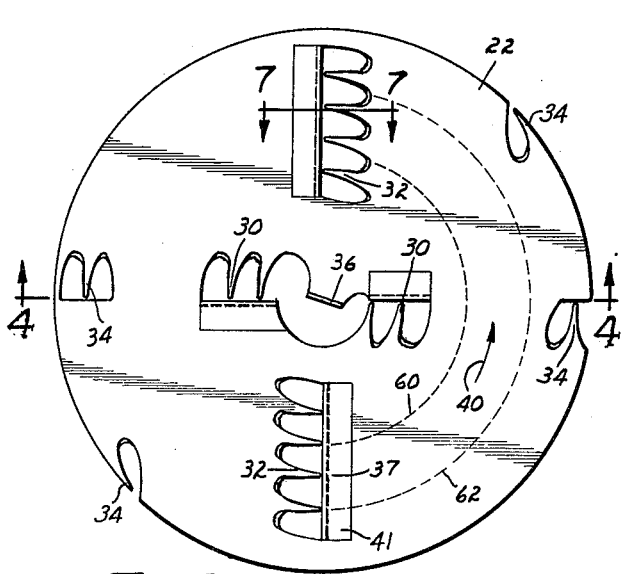
FIGURE 3 is an enlarged plan view of the bottom of the cutting head or disk forming part of the invention.
Figure 4:
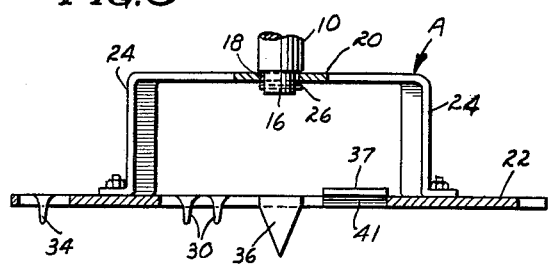
FIGURE 4 is a side elevational view, partially in section, taken along the line 4—4 of FIGURE 3 with the cutting head or disk rotated 180° from its position of FIGURE 3.
Figure 7:
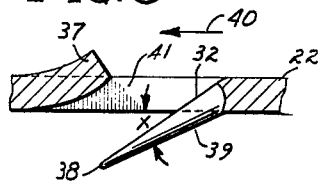
FIGURE 7 is an enlarged fragmentary view, partially in section, taken along the line 7—7 of FIGURE 3.

The structural features of disk 22 are best illustrated in FIGURES 3, 4 and 7. As shown, disk 22 is punched or otherwise cut out to form a multiplicity of depending teeth. Disk 22 is made of steel that varies in thickness from 1/8" to about 1/4" depending upon the type of steel used. The lower teeth formed from disk 22 include a central pilot tooth 36, which etxends downwardly from disk 22 in a perpendicular manner. Also provided are a set of inner teeth 30, two sets of intermediate teeth 32, and a plurality of radially and circumferentially spaced outer teeth 34, all of which are circumferentially curved.

Each of the teeth included in sets 30 and 32 and the outer teeth 34 are ground into a generally elongated conical form and inclined with the plane of disk 22 in the direction of rotation. FIGURE 7 illustrates one of the teeth of set 32, which is representative of the other teeth in sets 30 and 34. The tooth, inclined downwardly and forwardly in the direction of rotation (represented by arrow 40) is characterized by a relatively sharp point 38 and a conical body 39. A shoulder 37 is formed in the disk 22 in spaced relation to each set 30 and 32 to allow space in the form of slots 41 for the discharge of ice therethrough. The angle of inclination of shoulder 37 is approximately equal to the angle of inclination of the teeth. It has been found that when the teeth are inclined about 28° with the plane of disk 22, as indicated by reference character X in FIGURE 7, maximum cutting efficiency is obtained.

The location of the teeth in disk 22 will now be described in detail. Central pilot tooth 36, which extends normal to the plane of disk 22, is surrounded on each side by the teeth making up inner set 30. Half of the teeth of inner set 30 are on one side of pilot tooth 36 while the other half of the set are diametrically arranged on the opposite side thereof. The ends of the teeth in set 30 are in circumferential alignment and each tooth thereof is radially spaced from each other and from the other teeth in disk 22. The teeth making up intermediate set 32 are divided into two parts that are spaced 180° apart, as shown in FIGURE 3. Each tooth in the individual parts of set 32 is in circumferential alignment with the teeth adjacent thereto while all of the teeth in set 32 are radially spaced from each other and from the remaining teeth in disk 22. As can be seen from FIGURE 3, intermediate set 32 is displaced 90° from inner set 30. The teeth comprising outer set 34 are also radially spaced from each other and from the other teeth in disk 22. Two of the teeth in set 34 are located on the perimeter of disk 22 to serve as reamers during the rotation of the auger. The other teeth in set 34 are circumferentially and radially spaced from each other and from the other teeth in disk 22.

Figure 5:
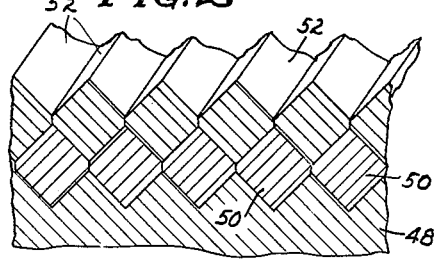
FIGURE 5 is an isometric block diagram illustrating the cutting action accomplished by the invention.
Figure 6:
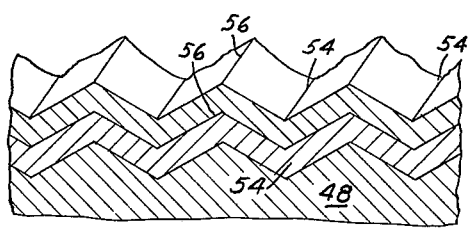
FIGURE 6 is a view similar to FIGURE 5 showing the cutting action accomplished by conventional ice augers.

FIGURES 5 and 6 illustrate the advantages obtained by my device as compared with conventional ice augers. Reference character 48 represents a block of ice being subjected to a cutting action. As shown in FIGURE 5, each tooth in disk 22 describes its own concentric path independently of the other teeth. This interspacing of the teeth, both circumferentially and radially, eliminates the the concentric furrows that are formed during the cutting action of conventional augers, as represented by the block diagram of FIGURE 6. It can be seen that the resulting lands and grooves cut by conventional augers impede the progress of the cutting action and tend to build up large ridges during the rotation of the cutting head. This is illustrated by reference characters 54 and 56 in FIGURE 6. In addition, the forwardly inclined position of the teeth in my invention make the device operate more like an ice pick with a splitting or blasting action than a conventional ice auger which uses a shaving action. Dotted lines 62 and 63 show the radial interspacing of the teeth in disk 22; the teeth, while described as generally conical, may be formed in other cross-sectional shapes. These may include a tapered flat configuration or an elongated pyramidal shape.

It should be noted that teeth 30, 32 and 34 are curved concentrically according to their radial distances from the axis of disk 22. It is within the scope of my invention to provide teeth that are tangent or angularly positioned with respect to their concentric location.

FIGURE 1 shows a cylindrical shield or container 64 mounted in a coaxial position on the top of disk 22. Container 64 may be fastened by well known means to disk 22 or it may be allowed to reside without support on disk 22.

My invention has been sufficiently tested and found to be entirely satisfactory. It will be obvious to those skilled in the art that my invention may be modified by many substitutions and equivalents and that this disclosure is intended to be illustrative only. Therefore, I intend to be limited solely by the scope of the appended claims.

I claim:

1. In an ice auger, a circular cutting disk rotatable about a central vertical axis, a first set of depending radially spaced circumferentially aligned cutting teeth on said disk, a second set of depending radially spaced circumferentially aligned cutting teeth on said disk in circumferentially spaced relation to said first set of cutting teeth, a central pilot point on said disk, a third set of depending circumferentially aligned cutting teeth radially spaced between said pilot point and said first and second set of teeth, at least one cutting tooth in said first set is circumferentially positioned between said first and second sets of teeth on the perimeter of said disk, said disk having shoulder and slot means adjacent said sets of teeth for allowing the removal of material cut thereby, and means for rotating said disk.

2. The device of claim 1 wherein a cylindrical sleeve is mounted on said disk.

3. The device of claim 1 wherein said teeth project downwardly and forwardly in the direction of rotation of said disk.

4. The device of claim 3 wherein said teeth are in the form of slender elongated cones each having a sharp point extending in the direction of rotation and inclined to the plane of said disk.

5. The device of claim 4 wherein the angle of inclination of said teeth is between 20° and 40°.

6. In an ice auger, a circular cutting disk, a central pilot point depending from said disk, a plurality of circumferentially spaced sets of cutting teeth depending in a forwardly inclined manner from said disk, said teeth in said disk being radially spaced from each other and each having a slender generally conical body terminating in a relatively sharp ice cutting point, said disk having shoulder and slot means adjacent said teeth defining means for removing the material cut by said teeth, and means for imparting rotational movement to said disk, said last mentioned means consisting of a spider attached to the top of said disk, said spider having a central aperture therein, and an operating shaft secured at one end to said spider, said shaft being relatively loosely retained within the aperture of said spider whereby to permit said disk to oscillate slightly about a vertical axis during the rotation thereof in cutting contact with the ice being bored.

7. In an ice auger, a circular cutting disk, a central pilot point depending from said disk, a plurality of circumferentially spaced sets of cutting teeth depending in a forwardly inclined manner from said disk, said teeth in said disk being radially spaced from each other and each having a slender generally conical body terminating in a relatively sharp ice cutting point, said teeth being curved in the direction of rotation, the radius of curvature of each of said teeth coinciding generally with the axis of the concentric paths followed by said teeth during the rotation of said disk, said disk having shoulder and slot means adjacent said teeth defining means for removing the material cut by said teeth, and means for imparting rotational movement to said disk.

8. In an ice auger, a circular cutting disk, a central pilot point depending from said disk, a plurality of circumferentially spaced sets of cutting teeth depending in a forwardly inclined manner from said disk, said teeth in said disk being radially spaced from each other and each having a slender generally conical body terminating in a relatively sharp ice cutting point, circumferentially spaced reamers depending in a forwardly inclined manner from said disk in radially outwardly spaced relation to said sets of teeth, said disk having shoulder and slot means adjacent said teeth defining means for removing the material cut by said teeth, and means for imparting rotational movement to said disk.

References Cited in the file of this patent

UNITED STATES PATENTS

| | | |
|---|---|---|
| 127,710 | Rupp | June 11, 1872 |
| 966,377 | Barker | Aug. 2, 1910 |
| 1,013,823 | Sheldon | Jan. 2, 1912 |
| 1,099,379 | Keenan | June 9, 1914 |
| 2,733,047 | Morgan | Jan. 31, 1956 |
| 2,873,950 | Kandle | Feb. 17, 1959 |
| 2,893,695 | Gerlikowski | July 7, 1959 |

FOREIGN PATENTS

| | | |
|---|---|---|
| 216,928 | Australia | Aug. 22, 1958 |